United States Patent
De Winter et al.

(10) Patent No.: US 8,318,259 B2
(45) Date of Patent: Nov. 27, 2012

(54) METHOD FOR PRODUCING A MOULDED ARTICLE COMPRISING A SPRAYED POLYURETHANE LAYER

(75) Inventors: Hugo De Winter, Brussels (BE); Gert Stalpaert, Brussels (BE); Jan Willems, Brussels (BE)

(73) Assignee: Recticel Automobilsysteme GmbH, Rheinbreitbach (DE)

( * ) Notice: Subject to any disclaimer, the term of this patent is extended or adjusted under 35 U.S.C. 154(b) by 805 days.

(21) Appl. No.: 11/313,691

(22) Filed: Dec. 22, 2005

(65) Prior Publication Data

US 2006/0153991 A1    Jul. 13, 2006

Related U.S. Application Data

(63) Continuation-in-part of application No. PCT/EP2004/051211, filed on Jun. 23, 2004.

(30) Foreign Application Priority Data

Jun. 27, 2003    (WO) ........................ PCT/BE03/00115

(51) Int. Cl.
*B05D 1/02* (2006.01)

(52) U.S. Cl. ..................................... 427/421.1; 264/309

(58) Field of Classification Search ............... 427/421.1
See application file for complete search history.

(56) References Cited

U.S. PATENT DOCUMENTS

| | | | |
|---|---|---|---|
| 3,923,253 A | 12/1975 | Stewart | |
| 4,247,581 A | 1/1981 | Cobbs, Jr. et al. | |
| 4,619,162 A | 10/1986 | Van Laere | |
| 4,649,162 A * | 3/1987 | Roche et al. | ................. 521/78 |
| 4,809,909 A | 3/1989 | Kukesh | |
| 4,816,542 A * | 3/1989 | Liebl et al. | ....................... 528/59 |
| 5,071,683 A | 12/1991 | Verwilst et al. | |
| 5,656,677 A | 8/1997 | Jourquin et al. | |
| 5,662,996 A * | 9/1997 | Jourquin et al. | ........... 428/318.8 |
| 6,071,619 A | 6/2000 | De Winter | |
| 6,355,658 B1 | 3/2002 | Reboud-Ravaux et al. | |

FOREIGN PATENT DOCUMENTS

| | | |
|---|---|---|
| DE | 21 05 072 | 8/1972 |
| EP | 303 305 A2 | 2/1989 |
| EP | 379 246 A2 | 7/1990 |
| EP | 389 014 A1 | 9/1990 |
| WO | WO 93/23237 A1 | 11/1993 |

* cited by examiner

*Primary Examiner* — Timothy Meeks
*Assistant Examiner* — Nathan T Leong
(74) *Attorney, Agent, or Firm* — Sughrue Mion, PLLC

(57) ABSTRACT

For producing a polyurethane layer by spraying a polyurethane reaction mixture, this mixture is supplied under pressure to a spray nozzle, within the nozzle the reaction mixture is accelerated by passing it through one or more channels having a reduced cross-sectional area, and the accelerated reaction mixture is sprayed, with a predetermined amount of kinetic energy, through a spray opening out of the spray nozzle onto a surface. The channels wherein the reaction mixture is accelerated have a total minimum cross-sectional area of S mm$^2$, S being a value smaller than 1.0, the reaction mixture is sprayed out of the nozzle at a flow rate of between 10×S and 80×S g/sec, and, per gram reaction mixture, an amount of 0.05 to 2.5 mmol of a pressurized gas is sprayed together with the reaction mixture through said spray opening out of the nozzle to increase the kinetic energy of the reaction mixture which is sprayed out of the nozzle. By the addition of a pressurized gas to the reaction mixture, a same or even a better spray pattern can be achieved and the reaction mixture can be sprayed at a smaller flow rate.

51 Claims, 5 Drawing Sheets

METHOD FOR PRODUCING A MOULDED ARTICLE COMPRISING A SPRAYED POLYURETHANE LAYER

This is a Continuation-in-Part of International Application No. PCT/EP2004/051211, filed Jun. 23, 2004, the entire disclosure of which is hereby incorporated by reference.

BACKGROUND OF THE INVENTION

The present invention relates to a method for producing an article comprising at least a polyurethane layer, in which method a polyurethane reaction mixture is supplied under pressure to a spray nozzle, within the nozzle the reaction mixture is accelerated by passing it through one or more channels wherein the flow of reaction mixture achieves a minimum cross-sectional area measured perpendicular to the flow of the reaction mixture, the accelerated reaction mixture is sprayed, with a predetermined amount of kinetic energy, through a spray opening out of the spray nozzle onto a surface to produce said polyurethane layer and the reaction mixture is allowed to cure.

Such a method is disclosed in EP-B-0 303 305 and in EP-B-0 389 014. In the known method an elastomeric polyurethane skin layer showing a thickness larger than 0.3 mm, and preferably a thickness of between 0.5 and 2 mm, is produced by spraying a light stable polyurethane reaction mixture by means of an airless two-component spray nozzle in accordance with a predetermined spray pattern. The reaction mixture is more particularly sprayed out of the nozzle in the form of a film defining a hollow cone. Spraying of the reaction mixture is controlled so that this film falls apart into droplets having a medium volume diameter (M.V.D.), determined in accordance with ASTM E 799-81, of at least 100 μm, and preferably of at least 500 μm. The mould surface onto which the reaction mixture is sprayed may be the surface of a complex mould, designed for example to produce the skin of a dashboard and showing in particular narrow cavities and/or undercuts. According to EP-B-0 303 305 spraying the reaction mixture so that droplets of the above mentioned minimum average size are formed on a certain spray distance offers the advantage that the reaction mixture can be sprayed from varying spray distances without causing important differences in density and other physical properties such as the colour of the formed layer. This is of course especially important when the polyurethane layer has to be sprayed in complex moulds showing narrow cavities so that the spray distance cannot be kept constant.

A drawback of the known methods, and in particular of the spray nozzles used therein, is that in practice there is a lower limit for the minimum flow rate at which the reaction mixture can be sprayed. This lower limit is determined by the minimum dimensions of the nozzle which are feasible in practice and by the minimum flow rate of the reaction mixture required to obtain a stable spray pattern. The minimum dimensions of the spray nozzle are in particular determined by the minimum cross-sectional areas of the flow paths of the reaction mixture required to avoid clogging of the nozzle, for example when crystals are formed in the highly viscous reaction mixture. Especially the cross-sectional size of the channel or channels wherein the reaction mixture is accelerated is critical. These channels defined the minimum cross-sectional area of the flow path through the nozzle. As illustrated in Example 1 of EP-B-0 303 305 a nozzle showing 4 grooves or channels of 0.5×0.5 mm in the insert which is arranged in the nozzle to accelerate the reaction mixture and to create the required swirling motion of the reaction mixture in the cavity of the nozzle before spraying it out of the nozzle can be used to spray the reaction mixture at a flow rate of 25 g/sec. However, as illustrated in Example 2, for reducing the flow rate of the reaction mixture to 10 g/sec, only two grooves or channels can be provided in the insert, the dimensions of which have moreover been reduced to 0.3×0.3 mm. It is clear that the risk of clogging is increased in such narrow grooves and that the use of only two grooves may have a negative effect on the homogeneity of the spray pattern.

In order to be able to spray thinner polyurethane layers and/or polyurethane layers of a more uniform thickness, in particular also in narrow mould cavities of a complex mould wherein the reaction mixture is sprayed from a small spray distance, it should be possible to spray the reaction mixture at a sufficiently small flow rate. For this small flow rate, the spray pattern should still be sufficiently homogeneous and stable. Moreover, the small flow rate should be achieved without having to reduce the dimensions of the channel or channels wherein the reaction mixture is accelerated to such an extent that unacceptable clogging problems arise.

SUMMARY OF THE INVENTION

The solution offered by the present invention to solve this problem consists in that the flow of reaction mixture achieves in the channel or channels wherein the reaction mixture is accelerated a total minimum cross-sectional area of S mm$^2$, with S being a value smaller than 1.0, and preferably smaller than 0.9, in that the reaction mixture is sprayed out of the nozzle at a flow rate of between 10×S and 80×S g/sec, and in that, per gram reaction mixture, an amount of 0.05 to 2.5 mmol of a pressurised gas is sprayed together with the reaction mixture through said spray opening out of the nozzle to increase the kinetic energy of the reaction mixture which is sprayed out of the nozzle.

Due to the relatively small cross-sectional area of the channel or channels wherein the reaction mixture is accelerated, the reaction mixture can be sprayed at a relatively small flow rate. This flow rate can further be reduced by the addition of the gas to the reaction mixture before the reaction mixture is sprayed out of the nozzle since the addition of pressurised gas increases the kinetic energy of the reaction mixture and thus enables to achieve a stable spray pattern with a smaller flow rate of the reaction mixture. Compared to the existing air atomisation nozzles or air-assisted atomisation nozzles, the pressurised gas is added in accordance with the present invention only in relatively small amounts so that the reaction mixture droplets do not receive too much kinetic energy and the layer of reaction mixture sprayed on the mould surface is not disturbed, or at least not too much, by the flow of gas and reaction mixture sprayed out of the nozzle. Such low amounts of gas are possible due to the fact that the reaction mixture is sprayed at a flow rate higher than a minimum flow rate through the channel or channels wherein it is accelerated.

An essential difference with the method disclosed in the above described European patents is thus that, instead of spraying only the reaction mixture, this reaction mixture is sprayed together with a pressurised gas through the spray opening out of the nozzle. The present inventors have found that when reducing the flow rate of the reaction mixture through the nozzle a same stable spray pattern can be maintained by adding a gas to the reaction mixture to compensate for the smaller amount of reaction mixture. By a same spray pattern is meant that the droplets are of a substantial same size and are sprayed with a substantial same amount of kinetic energy. These two properties are important to be able to achieve a polyurethane layer with characteristics, in particular with a colour, a density and/or mechanical properties, which are substantially independent of the spray distance. According to the invention, it is essential that the amount of reaction mixture sprayed per time unit and per surface area of the channel or channels, as well as the amount of pressurised gas supplied to the nozzle, is within a predetermined range. Indeed, when spraying higher amounts of reaction mixture per surface area and per time unit, the desired low flow rate cannot be obtained without reducing the size of said channel or channels to such an extent that they will either clog or that they can no longer be made in practice. When spraying, on the other hand, smaller amounts of reaction mixture, too much gas is required to form a stable spray pattern so that the reaction mixture receives too much kinetic energy and/or is atomised in too small droplets. When producing a visible polyurethane skin layer, such high amount of kinetic energy and such small droplet sizes will result in colour and density variations when spraying from a varying spray distance. Even when having applied first a so-called in-mold coating as finishing layer onto the mould surface, problems arise when the reaction mixture has to be sprayed from a short spray distance. Indeed, due to the high amount of kinetic energy, the reaction mixture which is sprayed on the mould surface will be blown aside by the force of the reaction mixture which is being sprayed on the mould surface so that it is not possible to obtain a uniform thickness. The in-mold coating may even be damaged by the impact of the reaction mixture especially when using a flat instead of a three-dimensional spray pattern.

Spraying a polyurethane coating by air atomisation is already disclosed in U.S. Pat. No. 3,923,253. In contrast to the present invention, the polyurethane material is accelerated in a channel, more particularly in the annular space around the cylindrical impeller, having a relatively large cross-sectional area so that a relatively large amount of gas has to be injected in the nozzle to accelerate the reaction mixture leaving the annular channel around the impeller so that it will be atomised when leaving the nozzle. A similar method is disclosed in U.S. Pat. No. 4,649,162 using a nozzle having a spray opening with a diameter of 1.5 mm. In the examples given in this US patent, the polyurethane material was atomised through the nozzle at a flow rate of 420 g/min by means of 350 l air per minute, i.e. by a lot more gas than in the method according to the present invention. The nozzle was however kept at a sufficient distance from the surface to be coated, more particularly at a distance of 0.3 to 0.8 m.

In a preferred embodiment of the method according to the invention, the flow of the reaction mixture in the nozzle is split over at least two, preferably over at least three, and more preferably over at least four channels wherein the reaction mixture is accelerated.

An advantage of this embodiment is that a more uniform or homogeneous spray pattern can be obtained.

In a further preferred embodiment of the method according to the invention, said pressurised gas is added to the reaction mixture before this reaction mixture is accelerated by said one or more channels, and preferably after the reaction components of the reaction mixture have been mixed in a mixer disposed upstream the nozzle.

An advantage of this embodiment is that the pressurised gas and the reaction mixture are accelerated upto a similar speed in said channel or channels so that the pressurised gas can be used in an optimal way to increase the kinetic energy of the reaction mixture. This means that a smaller amount of gas is necessary to achieve a stable spray pattern so that the reaction mixture can be sprayed with less kinetic energy onto the mould surface.

In a preferred embodiment of the method according to the invention, the predetermined amount of kinetic energy of the reaction mixture which is being sprayed out of the nozzle is controlled, by controlling the flow rate of the reaction mixture and/or said amount of gas, in such a manner that the reaction mixture is sprayed out of the nozzle in the form of droplets having a medium volume diameter, determined according to ASTM E 799-81, larger than 50 µm, or in the form of a film which falls apart into such droplets at a distance from the nozzle.

It has been found that colour, density and/or mechanical property variations of the sprayed polyurethane layer as a consequence of a varying spray distance can be considerably reduced or even avoided when spraying the reaction mixture in this way. When the reaction mixture is sprayed in the form of a film out of the nozzle, the nozzle may even be kept at a spray distance from the mould surface smaller than the height of the film portion of the spray pattern, i.e. the reaction mixture may even reach the mould surface in the form of a film.

In a further preferred embodiment of the method according to the invention, the predetermined amount of kinetic energy of the reaction mixture which is being sprayed out of the nozzle is controlled, by controlling the flow rate of the reaction mixture and/or said amount of gas, in such a manner that the reaction mixture is sprayed out of the nozzle in the form of droplets having a medium volume diameter, determined according to ASTM E 799-81, smaller than 500 µm, preferably smaller than 200 µm and most preferably smaller than 100 µm, or in the form of a film which falls apart into such droplets at a distance from the nozzle.

Due to the fact that the droplet size is not only determined by the flow rate of the reaction mixture but also by the flow rate of the gas added thereto, the droplet size can be kept better under control in the method according to the present invention. By using smaller and better controlled droplet sizes, the size of the air bubbles which are enclosed in the polyurethane layer can be reduced and the mechanical properties improved and so that it is also possible to reduce the thickness of the polyurethane layer without creating "weak" spots or even perforations of the layer. The thickness of the polyurethane layer can for example be reduced to a thickness of 0.6 mm or even smaller, in particular to a thickness smaller than 0.5 mm. The production of thin polyurethane layers does not only result in a saving of material but will also increase the effect of an optional foam layer which may be applied against the back of the polyurethane (skin) layer to provide it with a so-called "soft touch". A further advantage of spraying the reaction mixture in the form of smaller and better controlled droplets is that a very thin layer of polyurethane can be sprayed per pass of the spray nozzle so that the spray nozzle may pass more than once over one place without producing a local thickening, or in other words so that there are more degrees of freedom for the movement of the spray nozzle thus rendering the programming of the spray robot easier.

In an advantageous embodiment of the method according to the invention, said gas is added to the reaction mixture from a source of gas supplying said gas at a substantially constant number of moles per time unit.

In this way a flow of liquid reaction mixture into the gas duct can be avoided for example when the flow of reaction mixture through the nozzle is hampered by an obstruction in the flow path since such an obstruction would immediately create an increase of the gas pressure.

BRIEF DESCRIPTION OF THE DRAWINGS

Further advantages and particularities of the invention will become apparent from the following description of some particular embodiments of the method according to the invention. This description is only given by way of illustrative example and is not intended to limit the scope of the invention as defined by the annexed claims. The reference numerals used in the description refer to the drawings wherein:

DETAILED DESCRIPTION OF THE INVENTION

The present invention relates to a method for producing a moulded article comprising at least a polyurethane layer. This polyurethane layer is achieved by spraying a reactive mixture of components producing polyurethane, called herein a polyurethane reaction mixture. This mixture is usually obtained by mixing two components, namely an isocyanate component and a polyol component, although it is possible to use more than two component streams. The sprayed polyurethane reaction mixture comprises preferably no solvents, or only a small amount of solvents, in particular less than 10% by weight, more particularly less than 5% by weight, so that the reaction mixture, when being sprayed, has a relatively high viscosity.

Figure 17:
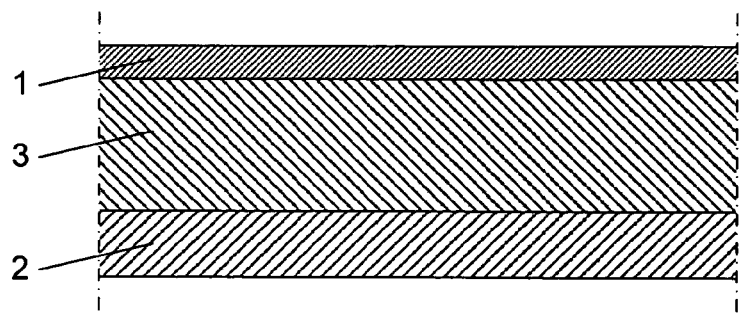
FIG. 17 is a schematic cross-sectional view of an article, in particular an interior trim part of a automotive vehicle, which can be made in accordance with the invention.

The sprayed polyurethane layer may be a foam layer. This foam layer is achieved by adding physical and/or chemical blowing agents to the reaction mixture. Most preferably, the method according to the present invention is however applied for spraying a polyurethane layer 1 having an average density higher than 300 g/l, preferably higher than 400 g/l and most preferably higher than 600 g/l. The polyurethane layer may be a rigid polyurethane layer but it is preferably a flexible elastomeric polyurethane layer, in particular a so-called polyurethane skin 1 having preferably an average thickness in the range of 0.1 to 3 mm, preferably 0.3 to 2 mm. In practice, especially in order to produce an interior trim part for automotive vehicles such as a dash board, a door panel, a console, etc., a rigid backing layer 2 is applied, as illustrated in FIG. 17, behind such skin layer 1 and, between both layers 1, 2 preferably an intermediate foam layer 3. As disclosed in EP-B-0 642 411, it is possible to produce the rigid backing layer 2 and the intermediate foam layer 3 by spraying a polyurethane reaction mixture. Although this can also be done in accordance with the present invention, the further description will be given with reference to the spraying of a flexible polyurethane skin 1.

Reaction mixtures for spraying such a polyurethane skin 1 are disclosed for example in EP-B-0 379 246. These reaction mixtures are composed by mixing an isocyanate component and a polyol component just before spraying the reaction mixture. The isocyanate component is based on aliphatic isocyanates in order to achieve a light-stable polyurethane skin 1. In practice, it is however also possible to spray a polyurethane skin 1 which is non-light stable. In the reaction mixture for such skins, use is made of more reactive aromatic polyisocyanates. Since they are not light-stable, a paint layer 4 can be applied onto such skins 1 either after having produced the skin or by applying the paint layer as an in-mold coating onto which the reaction mixture for the skin is then sprayed. A skin layer 1 covered by a paint layer 4 has been illustrated schematically in FIG. 19.

Figure 1:
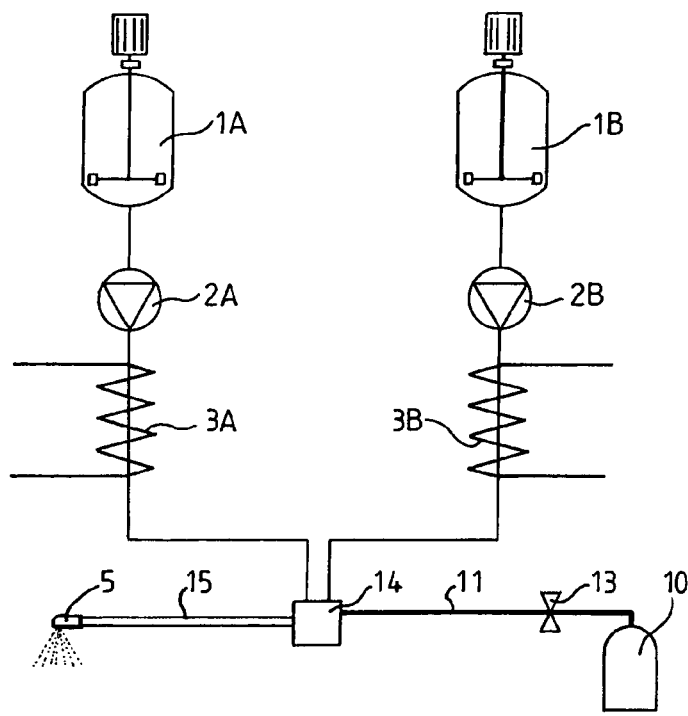
FIG. 1 is a schematic diagram showing the principle of spraying a polyurethane reaction mixture onto a mould surface in accordance with the present invention.

The basic principle for spraying the polyurethane reaction mixture is illustrated in FIG. 1.

In a first step, the two components, namely the polyol and the isocyanate component, are dosed from stirrer tanks 1A and 1B, by means of pumps 2A and 2B, are heated to the desired temperature, in a second step, in heat exchangers 3A and 3B before being mixed in a movable spray gun 4, provided with a spray nozzle 5. From this spray nozzle the reaction mixture is sprayed according to a predetermined spray pattern onto the mould surface 6. After having cured the reaction mixture, the formed polyurethane layer 9 can be removed from the mould surface 6, optionally after having applied one or more additional layers onto the back of the sprayed polyurethane layer. As explained hereabove, the polyurethane layer does not necessarily have to be sprayed onto a mould surface but can also be sprayed against another layer of the moulded article which is to be produced.

When spraying the viscous reaction mixture out of the nozzle 5, a spray pattern is achieved which usually consists of a film 7 which, after a certain distance d of for example 0.5 to 20 cm, falls apart into droplets 8. Spraying of the reaction mixture, in particular the kinetic energy of the reaction mixture leaving the nozzle, is preferably controlled in such a manner that this reaction mixture is sprayed out of the nozzle either directly in the form of droplets 8 having a medium volume diameter, determined according to ASTM E 799-81, larger than 50 µm, or in the form of a film 7 which falls apart into such droplets 8 at a distance from the nozzle 5. Spraying of the reaction mixture is further preferably controlled in such a manner that the droplets 8 have a medium volume diameter smaller than 500 µm, preferably smaller than 200 µm and most preferably smaller than 100 µm. When spraying in narrow cavities, it is possible that the spray distance D is smaller than the distance d after which the film falls apart into droplets so that the reaction mixture reaches the mould surface 6 in the form of the film 7.

Figure 4:
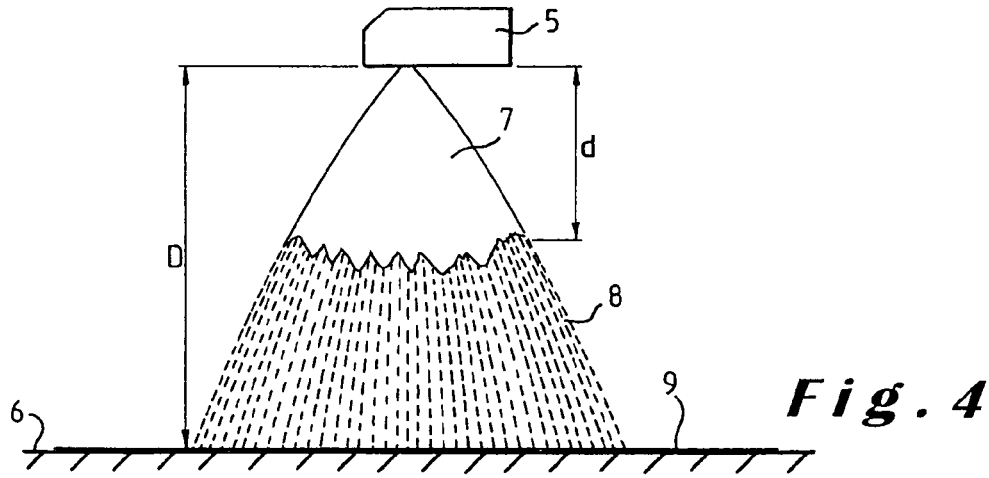
FIG. 4 shows schematically a side elevational view of a preferred spray pattern of the reaction mixture, more particularly of a hollow cone of reaction mixture sprayed out of the spray nozzle.

The reaction mixture may be sprayed in the shape of a flat fan or in the shape of a round or an elliptical cone which is preferably hollow. A hollow cone shaped spray pattern has been illustrated in FIG. 4 and is preferred in view of the fact that the kinetic energy of the sprayed reaction mixture drops more quickly so that, when reaching the mould surface from a same spray distance, the reaction mixture will have less kinetic energy enabling to spray a more uniform polyurethane layer 9.

An essential feature of the method according to the invention is that the kinetic energy of the reaction mixture which is sprayed out of the nozzle is increased by adding a pressurised gas to the reaction mixture so that this reaction mixture is sprayed, together with the pressurised gas, out of the nozzle 5. An advantage of the addition of gas is that the flow rate of the reaction mixture through the nozzle can be reduced whilst still giving it the required kinetic energy to produce the desired spray pattern when leaving the nozzle.

In FIG. 1 a gas bottle 10 containing pressurised gas is connected via a tubing 11 to the spray gun 4, more particularly to the mixing head 14 of the spray gun 4. The tubing 11 may be provided with a valve 13 which enables to shut off the flow of gas and which optionally enables to reduce the pressure of the gas. Preferably, a flow control device is provided in the tubing which enables to assure a constant flow rate of the gas to the nozzle. In this way, when some reaction mixture may have flown in the gas channels in the nozzle, a pressure can be built up enabling to blow the reaction mixture again out of these channels and to maintain a constant gas flow rate.

The pressurised gas is preferably nitrogen gas, although other gases such as air or oxygen or a mixture of gasses may also be used. The pressurised gas may be stored in a liquid state in the gas bottle and transferred to the nozzle. Preferably the gas to the nozzle is converted to its gaseous state. The gas is preferably supplied to the nozzle at a pressure of between 10 and 80 bars, more preferably at a pressure of between 15 and 50 bars.

In the embodiment of the spray gun illustrated in FIG. 1, the two component streams are brought together in the mixing head 14 of the spray gun 4, are mixed further in a bar shaped static mixer 15 and are then sprayed by means of the spray nozzle 5.

Figure 5:
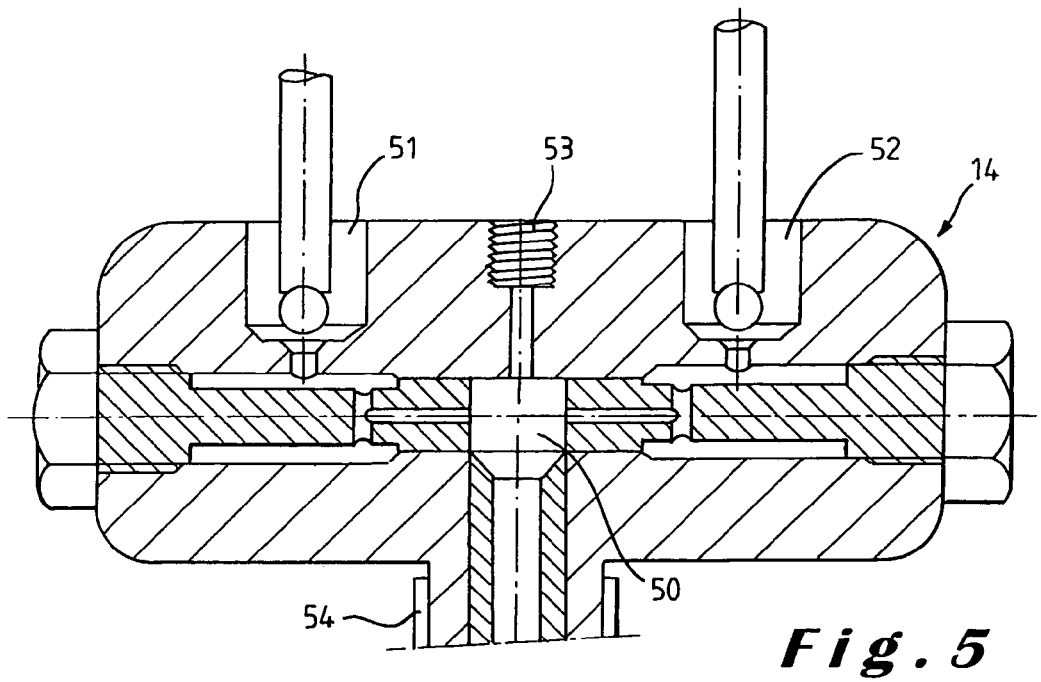
FIG. 5 shows schematically a cross-sectional view through the mixing head of the spray device illustrated in FIG. 1.

In a first embodiment of the method according to the invention, the pressurised gas can be added to the reaction mixture in the mixing head 14 of the spray gun 4, i.e. before the reaction mixture, and in this case the pressurised gas, is mixed in the static mixer. An example of a mixing head 14 enabling to add pressurised gas to the reaction mixture as a third component, is illustrated in FIG. 5. The mixing head has first of all a connector 54 for connecting the static mixer 15. Further it comprises a mixing chamber 50 provided with an inlet 51 for the polyol component and with an inlet 52 for the isocyanate component. Both inlets 51, 52 can be closed by means of a ball valve. To enable to add the pressurised gas, the mixing chamber is provided with a further inlet 53 for the pressurised gas. This inlet is threaded so that an adapter can be screwed therein for connecting the gas tubing 11. Instead of injecting the gas in the mixing chamber, so that the gas can be considered as an addition component stream, the pressurised gas could also be injected in the polyol or in the isocyanate stream.

Figure 2:
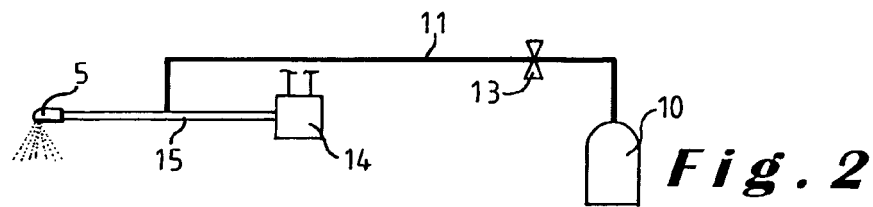
FIGS. 2 and 3 are schematic drawings of variant embodiments of the spray device comprised in the diagram of FIG. 1.
Figure 3:
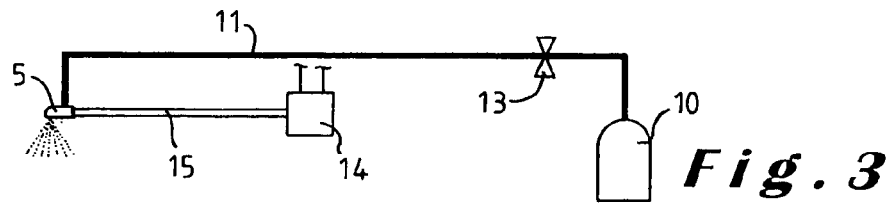

Although the pressurised gas can be injected into the reaction mixture before the actual mixing thereof in the mixer 15, the present inventors have found that such an early mixing of the gas may reduce the density of the sprayed polyurethane layer. When a higher density is desired, the pressurised gas is therefore preferably injected in the stream of reaction mixture either in the mixer itself (as illustrated schematically in FIG. 2) but more preferably after the reaction mixture has left the mixer 15, i.e. in the nozzle 5 itself (as illustrated schematically in FIG. 3).

Figure 6:
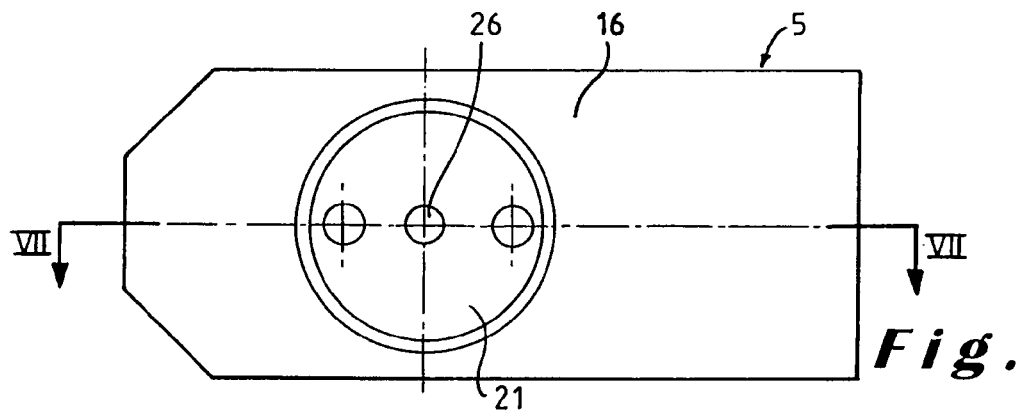
FIG. 6 shows a top plan view on a spray nozzle which can be used in the method according to the invention.

FIG. 6 illustrates a first embodiment of a spray nozzle which is arranged to inject the pressurised gas in the stream of reaction mixture passing through the nozzle. This spray nozzle 5 comprises a housing 16 having a tubular end 17 provided with an internal screw thread 18 by means of which it can be screwed onto the distal end of the static mixer 15. The housing 16 is further provided with a longitudinal bore 19, forming a supply channel ending in a larger, transverse bore 20 having an open end. The inner surface of the transverse bore 20 is screw threaded so that a spray piece 21 can be screwed into this bore 20. The spray piece 21 is a hollow piece which is open at the bottom so that a core piece 22 can be inserted therein and which has a closed top which engages the top of the core piece 22 so that, when the spray piece is screwed in the bore 20 of the housing 16, the core piece 22 is fixed therein. Between the top of the core piece 22 and the inner surface 23 of the spray piece 21 an outlet cavity 24 is formed in the nozzle. This cavity consists of a conical part and a cylindrical channel 25 extending through the top of the spray piece to form a spray opening 26 through which the reaction mixture is sprayed out of the nozzle. The dimensions of the conical part and of the cylindrical channel 25, and the shape and inclination of the inner surface 23 of the spray piece 21 can be adjusted in function of the desired spray pattern.

Figure 11:
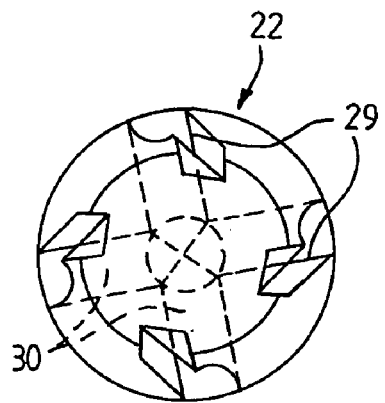
FIGS. 11 to 13 are respectively a top plan view, a side elevational view and a bottom view on the core tip of the nozzles illustrated in FIGS. 7 to 9.
Figure 12:
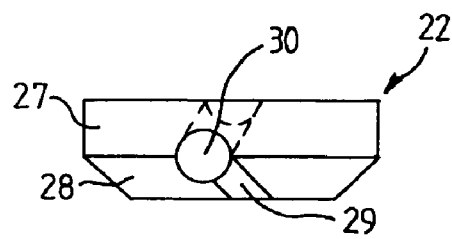
Figure 13:
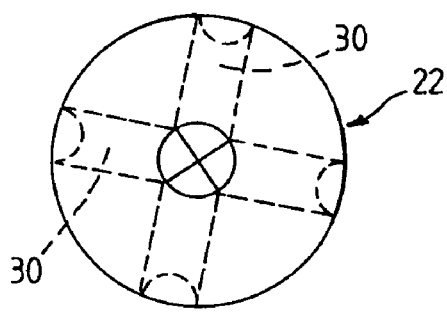

The core piece 22 is arranged to inject the reaction mixture supplied through the longitudinal bore 19 under an angle in the outlet cavity 24 so that it is subjected to a swirling motion when passing through the outlet cavity and when being sprayed out of the nozzle. As illustrated in FIGS. 11 to 13 the core piece 22 consists for example of a cylindrical portion 27 and a frustoconical portion 28 fitting within the hollow spray piece 21, the frustoconical portion 28 fitting more particularly against the conical inner surface 23 of the spray piece 21. In the frustoconical upper surface four grooves 29 are made. Each of these grooves 29 is connected by a cylindrical boring 30, ending centrally in the bottom side of the core piece, to the supply channel 19 so that the flow of reaction mixture is split over the four borings 30 and grooves 29. The cross-sectional area of the supply channel 19 is larger than the total cross-sectional area of the grooves 29 so that by passing the reaction mixture through the grooves 29 the reaction mixture receives a higher velocity or is in other words accelerated. The grooves 29 form thus channels 29 through which the reaction mixture is accelerated.

The nozzle used in the method according to the invention comprises at least one, but preferably at least two, more preferably at least three and most preferably at least four channels 29 through which the reaction mixture is accelerated before being sprayed out of the nozzle. More channels 29 enable to achieve a more uniform spray pattern but, the more channels 29 are provided, the smaller has to be the maximum cross-sectional area of these channels. The channels 29 have preferably each a cross-sectional area, or a minimum cross-sectional area when the cross-sectional area of the channels is not constant, which is smaller than 0.6 mm$^2$, and more preferably smaller than 0.4 mm$^2$. The minimum cross-sectional area of each channel 29, i.e. the cross-sectional area of the channel measured where the cross-section of the channel is the smallest, may be as small as for example about 0.085 mm$^2$ but should preferably be larger than 0.04 mm$^2$. The total minimum cross-sectional area of the different channels, i.e. the sum of the minimum cross-sectional area's of the different channels, should preferable larger than 0.10 mm$^2$, more preferably larger than 0.20 mm$^2$, so that more channels can be provided to achieve a more stable spray pattern. In the illustrated embodiments, the flow of reaction mixture occurs over the entire cross-sectional area of the channels 29 so that the minimum cross-sectional area of these channels is equal to the minimum cross-sectional area of the flow of reaction mixture in these channels.

In the method according to the invention, the total minimum cross-sectional area (=S mm$^2$) of the flow of reaction mixture in the channel or channels 29 should be smaller than 1.0 mm$^2$, preferably smaller than 0.9 mm$^2$ and more preferably smaller than 0.7 mm$^2$. In this way, even with a relatively small flow rate of the reaction mixture through the nozzle, the reaction mixture receives already a considerable amount of kinetic energy by passing through these channels 29. The flow rate at which the reaction mixture is sprayed out of the nozzle will preferably be situated within the range of 1 to 25 g/sec, more preferably within the range of 1 to 13 g/sec and most preferably within the range of 2 to 10 g/sec. According to the invention, the reaction mixture is to be sprayed out of the nozzle at a flow rate of between 10×S and 80×S g/sec. This flow rate is preferably smaller than 60×S g/sec, more preferably smaller than 50×S g/sec and most preferably smaller than 40×S g/sec. Moreover, it is preferably higher than 14×S g/sec. The described concepts are miniaturised spray nozzles which may be inserted into small or narrow mould cavities.

The nozzle concepts as illustrated in FIG. 6 to 10 are designed in such a way to minimise risks of clogging or material built up in the channel network.

Figure 7:
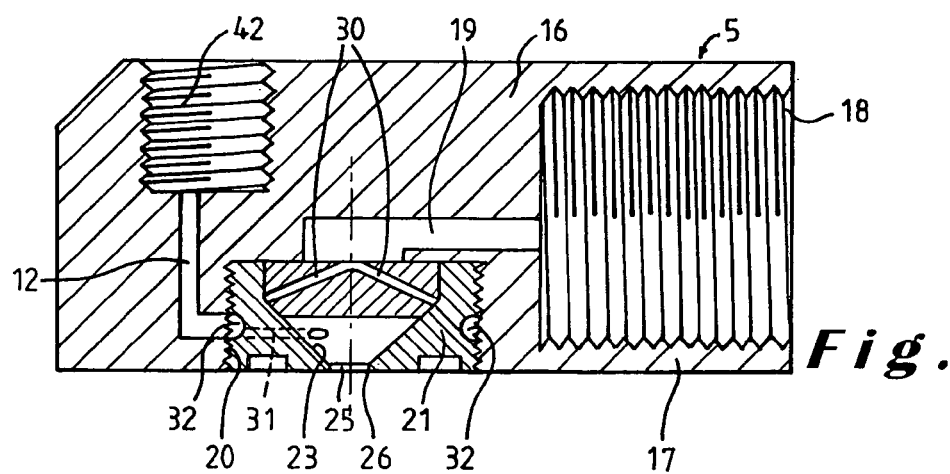
FIG. 7 is a cross-sectional view, taken along line IV-IV in FIG. 6.

In the nozzle illustrated in FIG. 7 further kinetic energy is added to the reaction mixture which has passed through the channels 29 in order to achieve the desired spray pattern. This is done by injecting pressurised gas from the bottle 10 through at least one boring 31 in the spray piece 21 into the outlet cavity 24 so that the pressurised gas is sprayed together with the reaction mixture through the spray opening 26 out of the nozzle. The boring 31 is directed under such an angle that the swirling motion of the reaction mixture injected by the grooves 29 also under an angle in the outlet cavity 24, or in other words the kinetic energy thereof, is increased. The pressurised gas is supplied by a boring 12 into an annular cavity 32 provided in the spray piece 21 at the level of the boring 31, the boring 12 ending in a cylindrical screw threaded outer cavity 42 wherein an adapter can be screwed for connecting the gas tubing 11 to the nozzle 5.

According to the invention, a relatively small amount of the pressurised gas is used to increase the kinetic energy of the reaction mixture, more particularly only 0.05 to 2.5 mmoles of gas per gram reaction mixture. For nitrogen gas, these amounts correspond to about 1.4 to 70 mg of $N_2$ per gram reaction mixture. An advantage of such small amounts of gas is that the kinetic energy of the gas leaving the nozzle through the spray opening does substantially not contribute to the total amount of kinetic energy arriving onto the sprayed surface. Preferably, the pressurised gas is supplied to the nozzle in an mount of at least 0.075, preferably at least 0.15 mmol per gram reaction mixture, the pressurised gas being preferably supplied to the spray nozzle in an amount of less than 1.5 mmol per gram reaction mixture, more preferably in an amount of less than 1.1 mmol per gram reaction mixture and most preferably in an amount of less than 0.75 mmol per gram reaction mixture.

In order to use the amount of pressurised gas more efficiently to increase the kinetic energy of the reaction mixture, the pressurised gas is preferably added to the reaction mixture before this reaction mixture is accelerated by the channel or channels 29. As explained hereabove, the pressurised gas is preferably supplied to the nozzle, i.e. it is preferably added to the reaction mixture after the mixing step is terminated.

Figure 8:
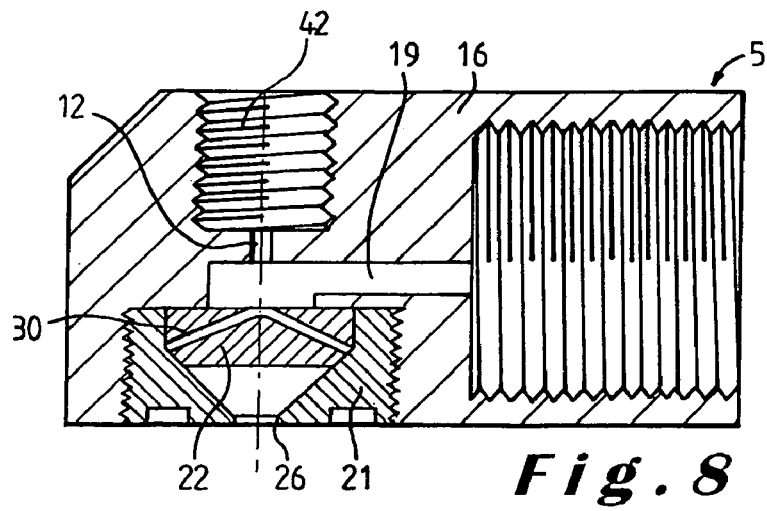
FIGS. 8 to 10 are views similar to the view of FIG. 7 but illustrating variant embodiments of the spray nozzle illustrated in FIG. 7.

FIG. 8 illustrates a first alternative of the spray nozzle 5 illustrated in FIG. 7 wherein the pressurised gas is added to the reaction mixture before it is accelerated in the channels or grooves 29. In this embodiment, a boring 33 is provided in the housing 16 of the nozzle ending in the supply channel 19. The tubing 11 is connected to this boring 33, via the screw threaded outer cavity 42, so that the pressurised gas is injected directly into the flow of reaction mixture. In order to achieve a better mixing of the gas in the reaction mixture, it is possible to provide more but smaller borings 33 ending all at another location in the supply channel 19.

Figure 9:
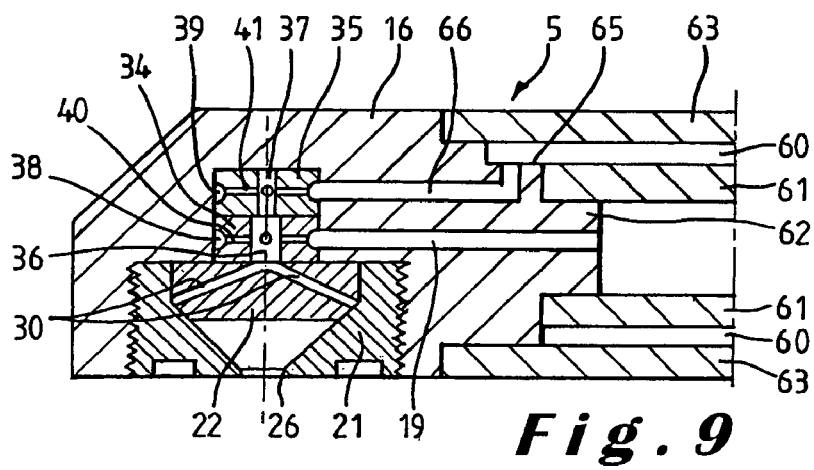

In FIG. 9, a better mixing of pressurised gas and reaction mixture is obtained by means of two cylindrical adapter pieces, namely one adapter piece 34 for the reaction mixture and one adapter piece 35 for the pressurised gas. Both adapter pieces 34 and 35 have an axial bore 36 and 37 and are stacked onto one another in a cylindrical cavity in the housing, situated underneath the core piece 22, so that the bores 36 and 37 form a channel ending in the borings 30 of the core piece 22. Both adapters have further a circumferential annular groove 38 and 39 which are connected by borings 40, 41 to the axial bores 36 and 67. Underneath and between the different adapter pieces and the core piece, flat seals are preferably provided which have however not been illustrated in FIG. 9 (also in FIGS. 7 and 8 the flat seals between the different components have not been illustrated).

In the embodiment of FIG. 9, the pressurised gas in not supplied to the nozzle by means of the tubing 11, but the tubing 11 is connected to the mixing head. The mixing head contains a gas channel ending in a co-axial channel 60 provided around the static mixer. This static mixer is contained in an inner tube 61 sealed to a connector part 62 of the nozzle 5. The co-axial channel 60 is defined by an outer tube 63 sealed onto a connector part 64 of the nozzle. The connector part 64 has a flattened side 65 so that a cavity is formed which is, on the one hand, in fluid communication with the co-axial gas channel 60 and, on the other hand, via a boring 66 to the annular groove 39 of the lowermost adapter 35. The borings 41 in the adapter 35 are directed under such an angle that the pressurised gas is made to swirl in the axial bore 37. This swirling gas flows then from the bore 37 into the bore 36 wherein the reaction mixture is injected from the supply channel 19 and the annular groove 38, through the borings 40 which are directed under a similar angle than the borings 41 so that the reaction mixture is made to swirl in the same direction as the pressurised gas. Due to the turbulence created in this way, the pressurised gas and the reaction mixture are better mixed before being supplied to the grooves 29.

Figure 10:
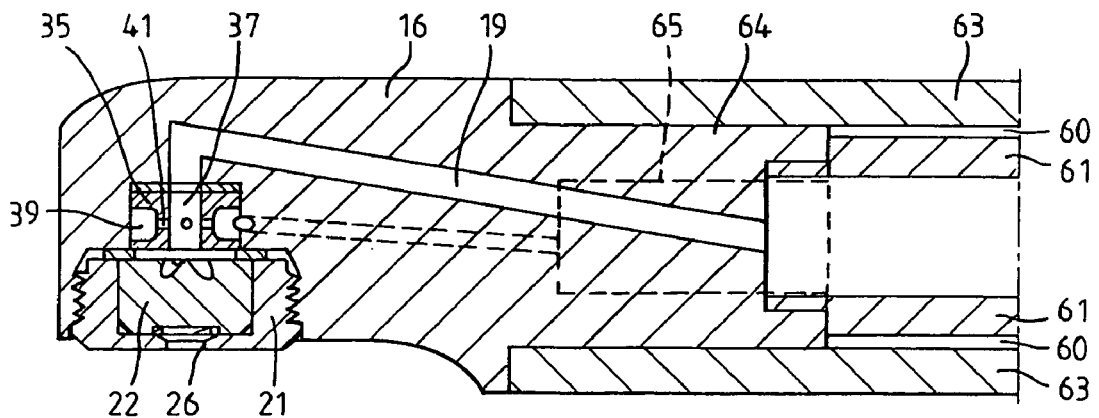

In FIG. 10 a good mixing of pressurised gas and reaction mixture is achieved by means of only one adapter piece, namely only the adapter piece 35 for the pressurised gas. In this embodiment the pressurised gas is also supplied through a coaxial channel 60 formed around the inner tube 61 of the static mixer and the outer tube 63 thereof. The connector part 64 for the outer tube 63 has also a flattened side 65 forming a cavity wherein the boring 66 for the pressurised gas ends. The supply channel 19 for the reaction mixture is connected to the bottom of the axial bore 37 in the adapter 35 so that the flow of reaction mixture now passes through this axial bore 37. In the adapter 35, the pressurised gas is injected through the four borings 41 into this flow of reaction mixture. It has been found that in this embodiment no swirling to the reaction mixture is necessary and that the best mixing can be obtained by injecting the pressurised gas through radial borings 41.

Figure 14:
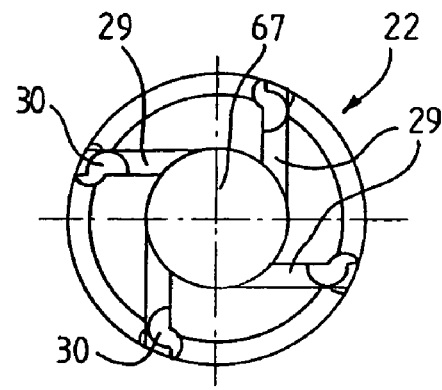
FIGS. 14 to 16 are respectively a top plan view, a side elevational view and a bottom view on the core tip of the nozzle illustrated in FIG. 10.
Figure 15:
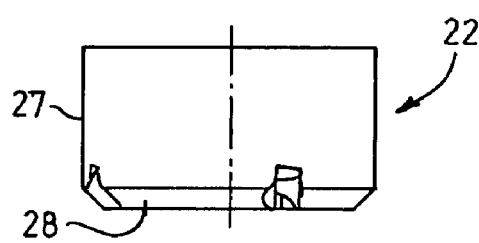
Figure 16:
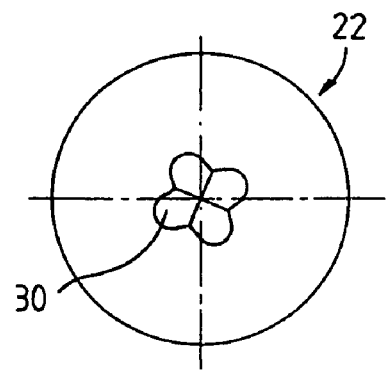

The spray piece 21 and the core piece 22 used in the embodiment of FIG. 10 have a shape which differs somewhat from the shape of the spray and core pieces used in the previous embodiments. As illustrated in FIGS. 14 to 16, the core piece 22 also consists of a cylindrical 27 and a frustoconical portion 28 fitting within the hollow spray piece 21. A difference is however that the core piece 22 engages with its flat top surface the flat inner top surface 23 of the spray piece 21 and that the top surface of the core piece is provided with a cylindrical recessed portion 67 wherein the grooves 29, which are now provided in the flat top surface of the core piece, end. The reaction mixture is thus guided through these grooves 29 in a direction which is substantially parallel to the surface of the spray opening 26. The depth of the grooves decreases gradually towards the recessed portion 67 so that the cross-sectional area thereof achieves a minimum value at the downstream end of the grooves 29, i.e. at the end where the grooves end in the recessed portion 67. This recessed portion in the core piece 22 forms, together with a small conical cavity in the spray piece 21 and the cylindrical channel 25 leading to the spray opening 26 the outlet cavity 24.

In the above described embodiments, the channels through which the reaction mixture is accelerated are formed by separate grooves 29 in the core piece 22, no reaction mixture passing along the lateral cylindrical side of the core piece. In other nozzle concepts, the reaction mixture may however be accelerated in one narrow annular channel or cavity formed between the inner wall of a cylindrical cavity and a cylindrical core piece inserted therein and having a somewhat smaller diameter than the inner diameter of the cylindrical cavity (see for example the annular cavity around the impeller of U.S. Pat. No. 3,923,253, which annular cavity has however a cross-sectional area larger than 1 mm$^2$). When the cylindrical core piece has for example a diameter of 5 mm, the inner diameter of the cylindrical cavity should for example be smaller than about 5.6 mm, at least when the reactive mixture passes the core piece in the axial direction. It is however also possible that the reaction mixture is injected laterally into the annular channel so that it makes a spiral movement around the cylindrical core piece and is thus also made to swirl when leaving the annular channel. In that case, the gap between the core piece and the inner wall of the cavity may be larger since only the cross-sectional area of the flow of the reaction mixture in this channel has to be measured and this perpendicular to the flow of reaction mixture. Moreover, the annular cavity may also narrow conically towards the outlet cavity so that the smallest cross-sectional area, at the outlet of the annular cavity has to be taken into account.

An advantage of the method according to the invention is that the spray pattern can be better controlled since this spray pattern can not only be controlled by adjusting the flow rate of the reaction mixture but also by adjusting the flow rate of the pressurised gas. In this way, the droplet size of the sprayed reaction mixture may be lowered, in particular to below 100 μm, without having a negative effect on the uniformity of the sprayed layer. Moreover, the robot programmed to spray the polyurethane layer can also be programmed to vary the flow rate of the reaction mixture depending on the spray distance.

Figure 18:
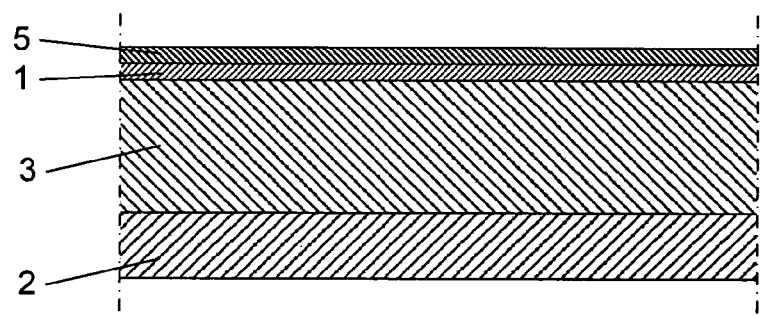
FIG. 18 is a schematic cross-sectional view of an article made in accordance with the invention where the outer layer is a flexible elastomeric polyurethane skin layer.
Figure 19:
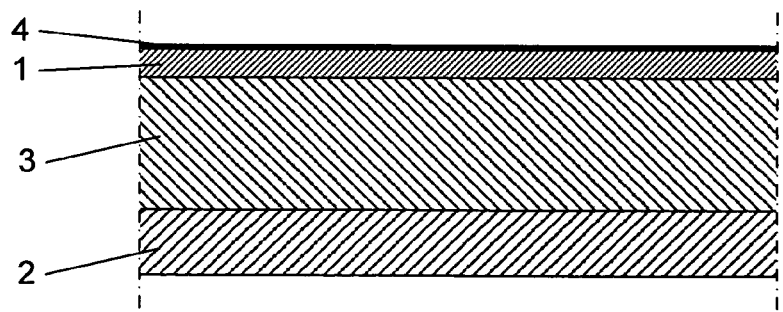
FIG. 19 is a schematic cross-sectional view of an article made in accordance with the invention where the outer layer is a paint layer.

The method according to the invention is in particular useful for producing flexible elastomeric polyurethane skins having a reduced stiffness. This is achieved by producing a so-called dual density skin comprising an outer layer and an inner polyurethane layer 1 which has a lower density than the outer layer. As illustrated in FIG. 19, the outer layer may be a paint layer 4 applied as solvent or water-based in-mold coating onto a mould surface before spraying the inner polyurethane layer 1 thereon. The outer layer may also be a flexible elastomeric polyurethane skin layer 5 (see FIG. 18) or a combination of an outer paint layer and a flexible elastomeric polyurethane skin layer (not illustrated). It has been found that by the combination of such an outer layer 4 or 5 with an inner polyurethane layer 1 with a reduced density, a more flexible polyurethane skin can be achieved. Such a more flexible polyurethane skin enhances the soft touch or feel provided by the polyurethane foam layer 3 which is usually moulded against the back of the skin layer 1, in particular between the skin layer 1 and a rigid substrate layer 2.

The paint layer 4 has usually an average thickness smaller than 100 μm, in particular smaller than 50 μm. Such a thin paint layer has almost no effect on the stiffness of the polyurethane skin.

When a polyurethane skin layer 5 is provided on the outside of the lower density polyurethane layer 1, its average density is preferably higher than 700 g/l. The outer polyurethane skin layer 5 has moreover in particular an average thickness smaller than 1 mm, preferably smaller than 0.75 mm, more preferably smaller than 0.6 mm, but larger than 0.1 mm, preferably larger than 0.2 mm and more preferably larger than 0.3 mm. Such thin polyurethane skin layers 5 cannot be used as such as polyurethane skin. A lower density polyurethane backing layer 1 is indeed required to provide the necessary mechanical properties and also to close any porosity which occur in thin polyurethane skin layers 5. Such porosity would otherwise lead to bleeding of the backfoam system 3 through the skin. It has been found that the combination of a thin, high density polyurethane skin layer 5 with an elastomeric polyurethane layer 1 of a lower density, a skin can be obtained which is more flexible than the conventional high density skins.

The outer polyurethane skin layer 5 can be produced either by means of the conventional spray techniques or by means of the spray technique according to the invention wherein a pressurised gas is added to the reaction mixture to enable to spray at a lower flow rate. As explained hereabove, this technique enables to spray polyurethane layers which are thinner and/or which have a more uniform thickness.

The inner polyurethane layer 1 of the dual density skin may have an average thickness smaller than 3 mm, preferably smaller than 2 mm, more preferably smaller than 1 mm, but larger than 0.2 mm, preferably larger than 0.3 mm and more preferably larger than 0.4 mm. Its average density is preferably comprised between 200 and 1000 g/l, more preferably between 300 and 700 g/l and most preferably between 300 and 500 g/l. Such an inner polyurethane layer 1 is preferably a micro-cellular elastomeric polyurethane layer.

The inner polyurethane layer 1 could also be produced by the conventional spray techniques. It is indeed possible to reduce the density of the sprayed polyurethane layer 1 by adding for example water as chemical blowing agent to the polyurethane reaction mixture. When spraying the inner polyurethane layer 1, the density of this layer is however preferably at least partially reduced by spraying the polyurethane reaction mixture in accordance with the method according to the invention wherein a pressurised gas is added to the reaction mixture, in this case not only to enable to spray at a lower flow rate but also to achieve a density reduction. The pressurised gas is more particularly added sufficiently early to the polyurethane reaction mixture so that at least a portion of the pressurised gas is in a dispersed gaseous state in the reaction mixture which leaves the spray nozzle so that the reaction mixture arrives in the form of a froth onto the back of the outer polyurethane skin layer 5 or of the outer paint layer 4.

It has been found quite by surprise that when adding the pressurised gas sufficiently early to the polyurethane reaction mixture so that at least a portion thereof is dispersed in the reaction mixture leaving the nozzle, the dispersed gas does not immediately escape out of the fine droplets which are sprayed but it remains at least partially into those droplets so that a froth with a reduced density is deposited onto the surface. It has been found that in this way, i.e. without any chemical or physical blowing agents, the density of the polyurethane layer could be reduced to a density lower than 500 g/l.

An advantageous effect which was found to occur by spraying such a froth is that the run off of the reaction mixture was considerably reduced. Spraying such a froth was found to enable to cover so-called radii (sharply curved surface portions having for example a curvature radius smaller than 2 mm) with fewer passes of the spray nozzle so that in the area of such radii, the average thickness of the polyurethane layer could be reduced (enhancing thus the flexibility of the polyurethane skin in that area).

When reducing the density of the polyurethane layer 1 by the addition of the pressurised gas to the polyurethane reaction mixture, the density of the polyurethane layer 1 may further be reduced by adding also a chemical blowing agent, in particular water, to the reaction mixture. Such a chemical blowing agent reacts with isocyanate compounds to produce carbon dioxide gas in the sprayed polyurethane layer so that its density is reduced. Although a chemical blowing agent enables to achieve a reduced density, it has been found that its presence in the polyurethane reaction has no effect on the run off. Consequently, even when using a chemical blowing agent, a pressurised gas is preferably still added to the polyurethane reaction mixture, more particularly in such a manner that, when omitting the chemical blowing agent, the polyurethane layer would have a density lower than 700 g/l, more preferably lower than 600 g/l and most preferably lower than 500 g/l.

From the above description of some particular embodiments of the invention, it will be clear that all kinds of modifications can be applied thereto without leaving from the scope of the invention as defined in the appended claims.

In particular, it is possible to provide a further supply of pressurised gas to the nozzle, more particularly to generate a "gas curtain" around the sprayed reaction mixture in order to have an additional control of the shape of the spray pattern. This can be achieve by blowing the pressurised gas out of small outlet orifices in the spray nozzle in a way as illustrated for example in FIG. 20 of EP-B-0 303 305. The amount of gas blown in this way out of the nozzle, is not to be included in the amount of gas added to the reaction mixture since it has no or only a minimal effect on the kinetic energy of the sprayed reaction mixture.

EXAMPLE

By means of a spray nozzle wherein pressurised nitrogen gas was mixed in the same way into a polyurethane reaction mixture as illustrated in FIG. 10 a flexible elastomeric polyurethane layer was sprayed in a thickness of 0.7 mm on a mould surface. The supply channel 19 of the reaction mixture had a diameter of about 1 mm whilst the total minimum cross-sectional area of the four grooves 29, measured at their downstream end, was about 0.35 mm$^2$.

When spraying the reaction mixture at about 8 g/sec and injecting the nitrogen gas at a flow rate of about 4 g $N_2$/min, a stable spray pattern was obtained and the sprayed polyurethane layer had a density of about 950 g/l.

When using a similar prior art nozzle, having no possibility to supply a gas, the same stable spray pattern could be achieved but only with a flow rate of the reaction mixture of about 14 g/sec. This shows that a very limited addition of pressurised gas enables a substantial reduction of the flow rate of the reaction mixture and a better distribution of the spray droplets on the surface resulting in optimised skin characteristics.

The invention claimed is:

1. A method for producing an article comprising at least a polyurethane layer, in which method a polyurethane reaction mixture is supplied under pressure to a spray nozzle, within the nozzle the reaction mixture is accelerated by passing it through one or more channels wherein the flow of reaction mixture achieves a minimum cross-sectional area measured perpendicular to the flow of the reaction mixture, the accelerated reaction mixture is injected under an angle in an outlet cavity of the nozzle to make the reaction mixture swirl in this outlet cavity, the outlet cavity forming a spray opening through which the swirling reaction mixture is sprayed, with a predetei mined amount of kinetic energy, out of the spray nozzle onto a surface to produce said polyurethane layer and the reaction mixture is allowed to cure, in which method the flow of reaction mixture achieves in said one or more channels a total minimum cross-sectional area of S mm$^2$, S being a value smaller than 1.0, the reaction mixture is sprayed out of the nozzle at a flow rate of between 10×S and 80×S g/sec, and, per gram reaction mixture, an amount of 0.05 to 2.5 mmol of a pressurised gas is sprayed together with the reaction mixture through said spray opening out of the nozzle to increase the kinetic energy of the reaction mixture which is sprayed out of the nozzle, the pressurised gas being added to the reaction mixture before this reaction mixture is accelerated by said one or more channels, the reaction mixture and the pressurized gas being thus accelerated to a similar speed in said one or more channels.

2. The method as claimed in claim 1, wherein said reaction mixture is sprayed out of the nozzle at a flow rate smaller than 60×S g/sec.

3. The method as claimed in claim 1, wherein said reaction mixture is sprayed out of the nozzle at a flow rate larger than 14×S g/sec.

4. The method as claimed in claim 1, wherein said reaction mixture is sprayed out of the nozzle at a flow rate of between 1 and 25 g/sec.

5. The method as claimed in claim 1, wherein the total cross-section area of the flow of reaction mixture in said one or more channels is smaller than 0.60 mm$^2$, the total cross-section area of the flow of reaction mixture in said one or more channels being larger than 0.10 mm$^2$.

6. The method as claimed in claim 1, wherein said pressurised gas is supplied to the spray nozzle in an amount of at least 0.075, the pressurised gas being supplied to the spray nozzle in an amount of less than 1.5 mmol per gram reaction mixture.

7. The method as claimed in claim 1, wherein said gas is supplied from a source of gas supplying said gas at a substantially constant number of moles per time unit.

8. The method as claimed in claim 1, wherein the flow of the reaction mixture in the nozzle is split over at least two channels wherein the reaction mixture is accelerated.

9. The method as claimed in claim 1, wherein said predetermined amount of kinetic energy is controlled, by controlling the flow rate of the reaction mixture and/or said amount of gas, in such a manner that the reaction mixture is sprayed out of the nozzle in the form of droplets having a medium volume diameter, determined according to ASTM E 799-81, larger than 50 mm, or in the form of a film which falls apart into such droplets at a distance from the nozzle.

10. The method as claimed in claim 1, wherein said predetermined amount of kinetic energy is controlled, by controlling the flow rate of the reaction mixture and/or said amount of gas, in such a manner that the reaction mixture is sprayed out of the nozzle in the form of droplets having a medium volume diameter, determined according to ASTM E 799-81, smaller than 500 mm, or in the form of a film which falls apart into such droplets at a distance from the nozzle.

11. The method as claimed in claim 1, wherein the flow rate of the polyurethane reaction mixture and/or the amount of gas added thereto is varied when the spray distance is varied or has been varied.

12. The method as claimed in claim 1, wherein the reaction mixture is sprayed out of the nozzle in the shape of a round or elliptical cone or a flat fan.

13. The method as claimed in claim 1, wherein said gas is added in a gaseous state to the reaction mixture, the gas being added at a pressure of between 10 and 80 bars.

14. The method as claimed in claim 13, wherein said gas comprises nitrogen gas.

15. The method as claimed in claim 1, wherein said gas is added in a liquid state to the reaction mixture and is converted at least partially to a gaseous state before being sprayed out of the nozzle.

16. The method as claimed in claim 15, wherein said gas comprises $CO_2$ gas.

17. The method as claimed in claim 1, wherein said polyurethane reaction mixture is prepared by mixing at least two polyurethane reaction components in a mixer before being supplied to the nozzle, said pressurised gas being added to the reaction mixture after the reaction components have left the mixer.

18. The method as claimed in claim 1, wherein said polyurethane reaction mixture is prepared by mixing at least a first and a second polyurethane reaction component in a mixer before being supplied to the nozzle, said pressurised gas being added to the reaction mixture before the reaction mixture has left the mixer.

19. The method as claimed in claim 18, wherein said pressurised gas is added to the reaction mixture before the reaction mixture is introduced in the mixer.

20. The method as claimed in claim 19, wherein said pressurised gas is added to the reaction mixture by adding it to said first or to said second polyurethane reaction component before both reaction components are brought together.

21. The method as claimed in claim 18, wherein the pressurised gas is added to the reaction mixture so that the density of the sprayed polyurethane layer is reduced.

22. The method as claimed in claim 21, wherein the pressurised gas is added to the reaction mixture before this reaction mixture is entirely mixed in the mixer.

23. The method as claimed in claim 21, wherein the density of the sprayed polyurethane layer is reduced to an average density of between 300 and 600 g/l.

24. The method as claimed in claim 1, wherein said reaction mixture is sprayed to produce a polyurethane layer having an average density higher than 300 g/l.

25. The method as claimed in claim 1, wherein the polyurethane layer is a flexible elastomeric polyurethane layer.

26. The method as claimed in claim 24, wherein the polyurethane reaction mixture is sprayed in a layer having an average thickness of between 0.1 mm and 2 mm.

27. The method as claimed in claim 24, wherein the polyurethane reaction mixture is sprayed in a layer having an average thickness smaller than 0.6 mm.

28. The method as claimed in claim 1, wherein said article which is to be produced comprises a further layer forming said surface onto which the polyurethane reaction mixture is sprayed.

29. The method as claimed in claim 28, wherein the pressurised gas is added to the reaction mixture so that the density of the sprayed polyurethane layer is reduced.

30. The method as claimed in claim 29, wherein the density of the sprayed polyurethane layer is further reduced by adding a chemical blowing agent and/or a physical blowing agent to the polyurethane reaction mixture.

31. The method as claimed in claim 29 or 30, wherein the density of the sprayed polyurethane layer is reduced to an average density of between 200 and 1000 g/l.

32. The method as claimed in claim 31, wherein the density of the sprayed polyurethane layer is reduced to an average density of between 300 and 700 g/l.

33. The method as claimed in claim 28, wherein said further layer is a paint layer applied as an in-mold coating.

34. The method as claimed in claim 28, wherein said further layer is a flexible elastomeric polyurethane layer having an average density higher than the average density of the sprayed polyurethane layer.

35. The method as claimed in claim 28, wherein said polyurethane reaction mixture comprises one or more reactive aromatic polyisocyanates.

36. The method as claimed in claim 1, wherein the polyurethane layer is a polyurethane foam layer which is achieved by adding a physical and/or a chemical blowing agent to the reaction mixture.

37. The method as claimed in claim 36, wherein said article which is to be produced comprises a further layer forming said surface onto which the polyurethane reaction mixture is sprayed, said further layer being a flexible elastomeric polyurethane layer having a density higher than 600 $kg/m^3$.

38. The method as claimed in claim 1, wherein a first layer is sprayed onto a mould surface and the polyurethane reaction mixture is sprayed onto this first layer to produce said polyurethane layer on a back side of said first layer, said first layer having a higher average density than said polyurethane layer.

39. The method as claimed in claim 38, wherein said first layer is a paint layer sprayed as a solvent or water-based in-mold coating onto a mould surface.

40. The method as claimed in claim 38, wherein said first layer is a flexible elastomeric polyurethane skin layer obtained by spraying a further polyurethane reaction mixture onto a mould surface.

41. The method as claimed in claim 40, wherein said further polyurethane reaction mixture is sprayed in a same way for said polyurethane reaction mixture.

42. The method as claimed in claim 38, wherein said first layer comprises a paint layer sprayed as an in-mold coating onto a mould surface and a flexible elastomeric polyurethane skin layer obtained by spraying a further polyurethane reaction mixture onto a back side of the paint layer.

43. The method as claimed in claim 39, wherein said paint layer has an average thickness smaller than 100 μm.

44. The method as claimed in claim 40, wherein the flexible elastomeric polyurethane skin layer has an average density higher than 700 g/l.

45. The method as claimed in claim 40, wherein the flexible elastomeric polyurethane skin layer has an average thickness smaller than 1 mm, but larger than 0.1 mm.

46. The method as claimed in claim 38, wherein said polyurethane layer has an average density of between 200 and 1000 g/l.

47. The method as claimed in claim 46, wherein the average density of said polyurethane layer is at least partially reduced by adding said pressurised gas to the polyurethane reaction mixture so that at least a portion of the pressurised gas is dispersed in the reaction mixture leaving the nozzle so that the reaction mixture arrives in the form of a froth onto said surface.

48. The method as claimed in claim 47, wherein a chemical blowing agent, which reacts with isocyanate compounds to produce carbon dioxide to decrease the average density of the polyurethane reaction mixture after the reaction mixture has been sprayed onto said surface, is added to the polyurethane reaction mixture.

49. The method as claimed in claim 38, wherein said polyurethane layer has an average thickness smaller than 3 mm, but larger than 0.2 mm.

50. The method as claimed in claim 38, wherein said polyurethane layer is a micro-cellular elastomeric polyurethane layer.

51. The method as claimed in claim 38, wherein a polyurethane foam layer is moulded against the back of said polyurethane layer, between said polyurethane layer and a rigid substrate layer.

* * * * *